(12) United States Patent
Peter

(10) Patent No.: US 7,128,021 B1
(45) Date of Patent: Oct. 31, 2006

(54) MAMMAL MILKING DEVICE

(76) Inventor: Linda R. Peter, 51057 155th St., Austin, MN (US) 55412

( * ) Notice: Subject to any disclaimer, the term of this patent is extended or adjusted under 35 U.S.C. 154(b) by 0 days.

(21) Appl. No.: 11/114,755

(22) Filed: Apr. 26, 2005

(51) Int. Cl.
*A01J 5/02* (2006.01)

(52) U.S. Cl. .................................. 119/14.25

(58) Field of Classification Search ............ 119/14.22, 119/14.23, 14.24, 14.25, 14.26, 14.27, 14.28, 119/14.43, 14.47; 604/73, 74, 75, 76, 131, 604/151, 152, 153
See application file for complete search history.

(56) References Cited

U.S. PATENT DOCUMENTS

| | | | | |
|---|---|---|---|---|
| 1,184,293 A | * | 5/1916 | Zeratsky ................. | 119/14.33 |
| 3,187,719 A | * | 6/1965 | Jones ..................... | 119/14.08 |
| 3,279,431 A | * | 10/1966 | Simons ................... | 119/14.08 |
| 4,190,021 A | * | 2/1980 | Reisgies ................. | 119/14.44 |
| 4,857,051 A | * | 8/1989 | Larsson .................. | 604/74 |
| 4,929,229 A | | 5/1990 | Larsson | |
| 5,007,899 A | * | 4/1991 | Larsson .................. | 604/74 |
| 5,071,403 A | * | 12/1991 | Larsson .................. | 604/74 |

OTHER PUBLICATIONS

Farm Show® Advertisement; Sample Stories From 2006 Edition of "Best Of Farm Show" featuring Hand-Pumped Milking Machine; 6 pages.

* cited by examiner

*Primary Examiner*—T. Nguyen
(74) *Attorney, Agent, or Firm*—Merchant & Gould P.C.

(57) ABSTRACT

A mammal milking device includes a milk collection container, a vacuum generating device, and a teat attachment member. The teat attachment member is formed such that it forms an angle of between about 45 and 135 degrees between the teat attachment end and the vacuum attachment end. The vacuum generating device operates to pass milk from a mammal's teat, through the teat attachment member, and into the milk collection container. The teat attachment end is configured with a predetermined size for attachment to relatively small teats.

14 Claims, 2 Drawing Sheets

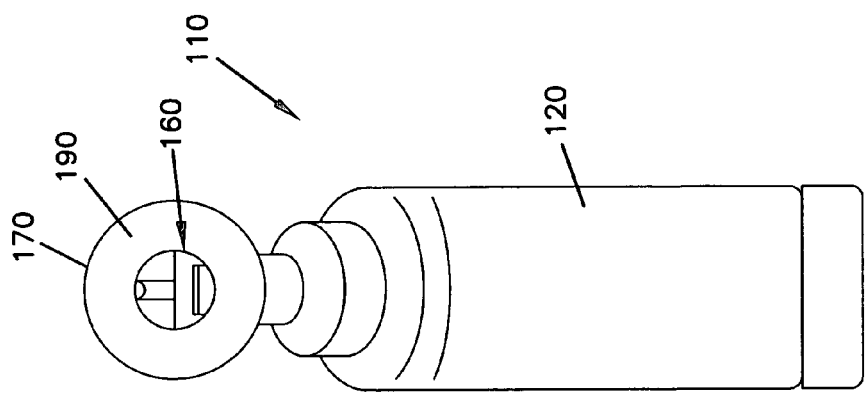
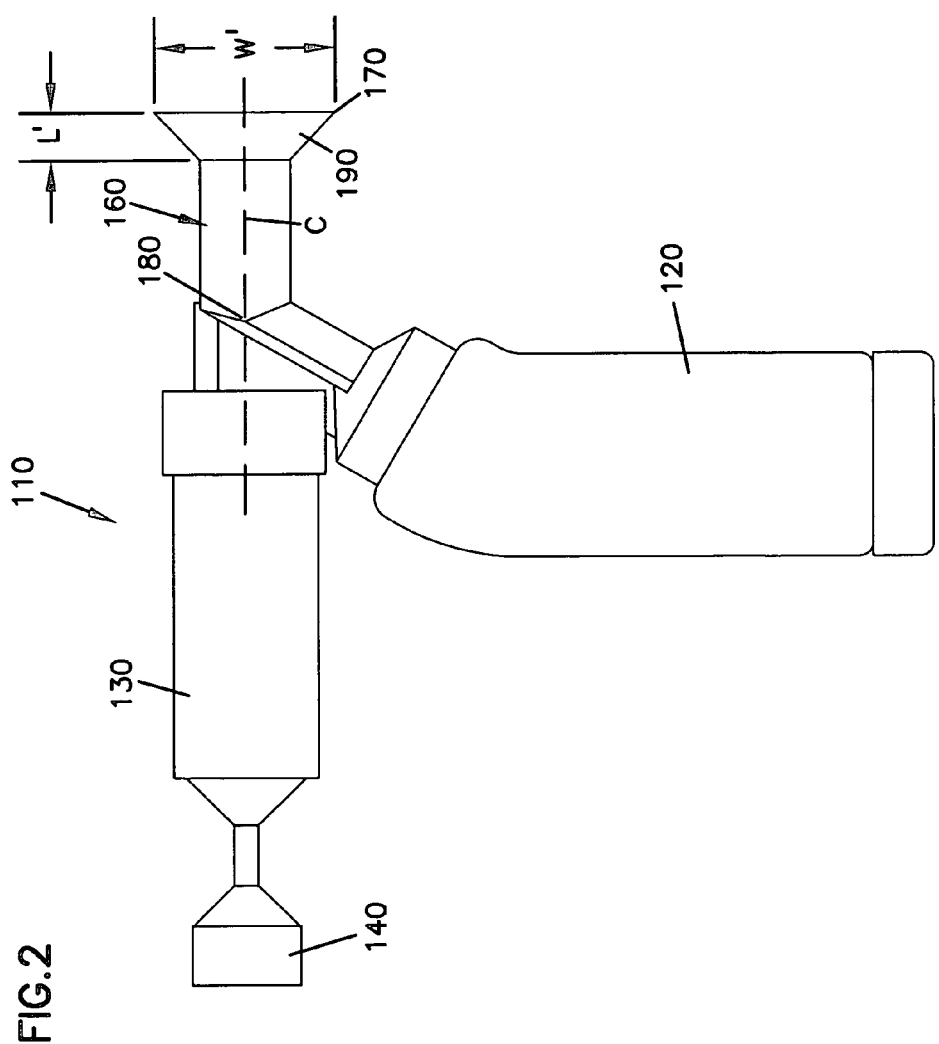

MAMMAL MILKING DEVICE

BACKGROUND OF THE INVENTION

1. Field of the Invention

The present invention relates generally to a device for milking mammals; and more particularly relates to a device for milking alpacas.

2. Related Art

Certain mammals have long been used as a source of milk for human consumption. For example, cows and goats have been commonly used for this purpose. Because of this use, various means for harvesting the milk of cows and goats have been successfully used. These means include manual and electric pump mechanisms.

However, there has been little attention paid to the milking of mammals other than those that provide milk for human consumption. Other than human consumption, there are other reasons that it may be useful to milk certain mammals. For example, alpacas are not generally known to produce milk for human consumption. Alpacas are a partially domesticated South American hoofed mammal that is generally bred for its long, lustrous wool, which varies from shades of black, brown, and white.

Although alpacas do not generally produce milk for human consumption, it is often desirable to milk alpaca mothers, called Dams, to assist in the raising of alpaca young, called Crias. It is not uncommon that a Dam either can't or won't allow its Cria to nurse directly from her teat. Also, a Cria may need more milk than its mother can provide and, therefore, it may be desirable to milk another lactating Dam to obtain the additional nutrition that the young Cria needs.

However, commercially available milking equipment for alpacas has not been available. Moreover, because alpacas have very small teats, traditional milking techniques designed for other mammals, such as cows and goats, will not work.

Accordingly, there is a need for a milking device that will work with alpacas and other mammals with very small teats. The present invention is directed at solving this problem and providing an effective and efficient milking device that can be used with alpacas and other small-teated mammals.

SUMMARY OF THE INVENTION

In accordance with the invention, the above and other desires and needs are met by providing a mammal milking device and a teat attachment device for use with a mammal milking device that is configured to attach to the small teats of an alpaca or other similar mammal.

In one embodiment, a mammal milking device includes a milk collection container, a vacuum generating device, and a teat attachment member. The teat attachment member has a teat attachment end and a vacuum attachment end. The teat attachment end is shaped for attachment to a mammal's teat and the vacuum attachment end is shaped to be attached to the vacuum generating device. In addition, the teat attachment member is formed such that it forms an angle of between about 45 and 135 degrees between the teat attachment end and the vacuum attachment end. The vacuum generating device operates to pass milk from a mammal's teat, through the teat attachment member, and into the milk collection container.

In another embodiment, a mammal milking device includes a milk collection container, a vacuum generating device, and a teat attachment member. The teat attachment member has a frustoconical section for attachment to a mammal's teat. The frustoconical section is preferably between about ¼ inch and ¾ inch in length with a maximum width of about 2 inches.

In yet another embodiment, a teat attachment device is provided for use with a mammal milking device. The teat attachment device includes a teat attachment member that has a frustoconical section for attachment to a mammal's teat, the frustoconical section being between about ¼ inch and ¾ inch in length with a maximum width of about 2 inches.

Thus, the mammal milking device and teat attachment device provide effective devices for milking a mammal that has small teats, such as the alpaca. These and various other advantages and features which characterize the invention are pointed out with particularity in the claims annexed hereto and forming a part hereof. However, for a better understanding of the invention, its advantages and objectives obtained by its use, reference should be had to the drawings which form a further part hereof and to the accompanying descriptive matter, in which there is illustrated and described a preferred embodiment to the invention.

BRIEF DESCRIPTION OF THE DRAWINGS

Referring to the drawings wherein like numerals represent like parts throughout the several views:

FIG. 2 is a side view of another embodiment of a mammal milking device of the present invention; and FIG. 3 is a front view of another embodiment of a the mammal milking device shown in FIG. 2.

DETAILED DESCRIPTION OF THE PREFERRED EMBODIMENT

Figure 1:
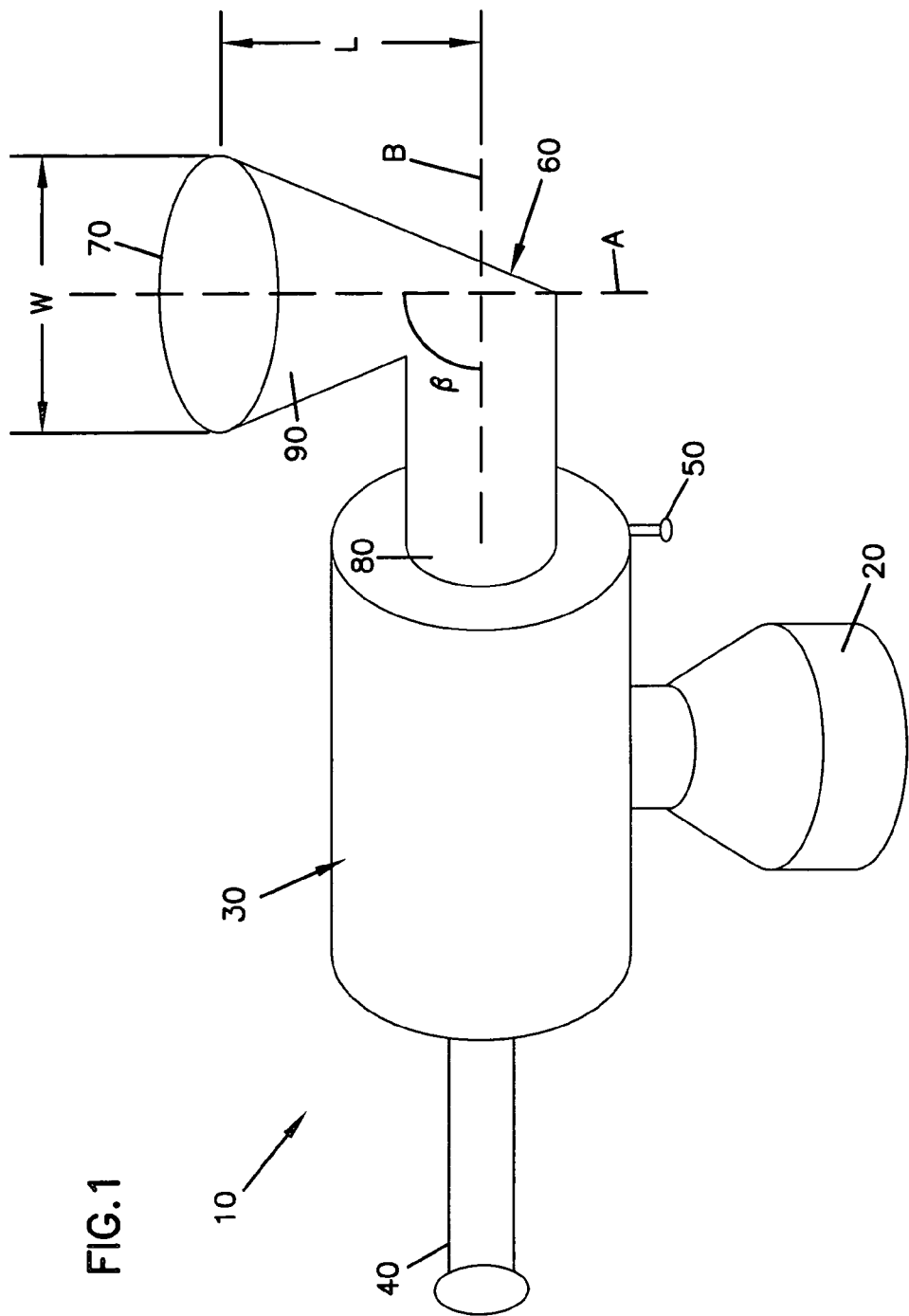
FIG. 1 is a perspective view of an embodiment of a mammal milking device of the present invention.

The present invention provides an effective solution to the problem of milking alpacas or other mammals with small teats. In addition, the present invention provides a novel shaped teat attachment to facilitate the milking of four legged mammals.

In the following description of the exemplary embodiment, reference is made to the accompanying drawings that form a part hereof, and in which is shown by way of illustration the specific embodiment in which the invention may be practiced. It is to be understood that other embodiments may be utilized when structural and other changes may be made without departing from the scope of the present invention.

Referring to FIG. 1, the mammal milking device 10 includes several elements. The device includes a milk collection container 20 for collecting the milk that is generated from the mammal. The milk collection container 20 can be of various shapes and sizes. It is preferable that it can hold at least 8 oz. of mammal milk. The milk collection container 20 can still be effective if it holds less than 8 oz., however, for most mammals, including alpacas, a single lactating female can produce more than 8 oz. of milk. Therefore, if the milk collection container 20 holds less that 8 oz., the milk collection container 20 would have to be emptied in order to collect the full amount of milk of one animal.

The milk collection container 20 is preferably attached to the bottom of the vacuum generating device 30 (discussed below) as shown in FIG. 1. However, the milk collection container 20 can be arranged in other configurations, so long as it is capable of holding milk obtained from the teat of the mammal.

Vacuum generating device 30 includes a vacuum forming chamber and a vacuum forming device. In FIG. 1, the vacuum generating device 30 includes a manual pump 40. The vacuum generating device 30 and the manual pump 40 are well known in the art and the design of these elements is not necessary to explain herein. It is also preferably that the vacuum generating device 30 include an electric vacuum pump attachment element 50. The element 50 is configured to allow a user to attach an electric vacuum pump (not shown) to the vacuum generating device 30. Electric vacuum pumps are well known and also not necessary to describe herein. It will be understood that the vacuum generating device 30 can be configured for use with either one, or both, of a manual vacuum pump and an electric vacuum pump.

As shown in FIG. 1, a teat attachment member 60 is attached to the vacuum generating device 30. The teat attachment member 60 has a teat attachment end 70 and a vacuum attachment end 80. The teat attachment end 70 is aligned along an axis or centerline A and the vacuum attachment end 80 is aligned along an axis or centerline B. The axis A and B an angle β of between about 45 and about 135 degrees. Preferably the angle β is between about 80 and about 100 degrees, and more preferably the angle β is about 90 degrees. By forming the teat attachment member within these ranges of angles, the mammal milking device 10 can be more easily used on the underside of a mammal. In FIG. 1, the angle β is about 90 degrees.

The change in direction of the teat attachment member 60 between the ends 70, 80 is shown in FIG. 1 as a relatively sharp angled structure at a 90 degree angle. Other embodiments may include an change of direction formed in a smooth or curved shape and construction thereby forming, for example, a U-shaped member.

The teat attachment member 60 includes a frustoconical section 90. This frustoconical (i.e., a truncated cone shape) section 90 is formed to attach the wider end to the teat of a mammal. When the vacuum generating device is operated (i.e., either manually or electrically pumped), a vacuum forms around the teat of a mammal and the teat attachment member 60 is suctioned onto the mammal around the teat. This causes milk to flow from the teat, through the teat attachment member 60, and, ultimately, into the milk collection container 20.

The teat of an alpaca is small compared to many other mammals that are traditionally milked. Generally, the teat size of an alpaca is about 1 cm to 1.5 cm in length (L) and about 0.5 cm to 0.75 cm in width (W). Because an alpaca has such small teats, the teat attachment member is preferably formed such that the frustoconical section for attachment to a mammal's teat is between about ¼ inch and ¾ inch in length, and has a maximum width of about 2 inches. Even more preferably, the frustoconical section should be between about ⅜ inch and ⅝ inch in length. This short length and width facilitates the use of the teat attachment member 60 with the small size of the alpaca's teats. Through experimentation, it was realized that this size and shape is much more effective to draw milk from the teat of an alpaca than was even slightly larger sized teat attachment members.

FIGS. 2 and 3 show another embodiment of the present invention. FIGS. 2 and 3 depict a mammal milking device with only a manual pump mechanism. Mammal milking device 110 includes a milk collection container 120. As noted above in the first embodiment, the milk collection container 120 can be in various shapes other than that depicted in FIG. 2.

Vacuum generating device 130 includes a manual pump mechanism 140. This manual pump mechanism is operated by pulling out a cylinder within the vacuum generating device 130 and, thereby, removing air from within the vacuum generating device 130. This forms a vacuum in the teat attachment member 160, which permits the teat attachment member 160 to suction itself to the area surrounding the teat of a mammal. In some embodiments, the manual pump mechanisms 40 (discussed above) and 140 may be interchanged with an automated pumping mechanism such as an electric or pneumatic pump. Further, the vacuum generating devices 30, 130 may be interchanged in different embodiments.

The teat attachment member 160 includes a teat attachment end 170 and a vacuum attachment end 180. In addition, as discussed above in the first embodiment, the teat attachment member 160 includes a frustoconical section 190. The frustoconical section 190 of this embodiment is similar to that of the first embodiment discussed above. Accordingly, similar dimensions (width (W') and length (L')) are preferable for the frustoconical section of this embodiment.

The ends 170, 180 are aligned along a common axis or centerline C as opposed to the angled arrangement of ends 70, 80 shown and described with reference to device 10. This coaxial, linear arrangement of ends 170, 180 is exemplary only, whereas many other arrangements of the ends of the teat attachment member are possible in other embodiments. Likewise, the spatial relationship of the teat attachment member, pump, and milk collection container of the milking device may be arranged in many other ways than those shown in FIGS. 1–3.

While particular embodiments of the invention have been described with respect to the milking of small-teated mammals, it will be understood by those of skill in the art that the invention is not limited by such application or embodiment for the particular components disclosed and described herein. It will be appreciated by those skilled in the art that other configurations that embody the principles of this invention and other applications therefore can be configured within the spirit and intent of this invention. The configuration described herein is provided as only example(s) of an embodiment(s) that incorporate(s) and practice(s) the principles of this invention. Other modifications and alterations are well within the knowledge of those skilled in the art and are to be included within the broad scope of the appended claims.

What is claimed is:

1. A mammal milking device, the device comprising:
 a milk collection container;
 a vacuum generating device having a longitudinal horizontal axis defined therein;
 a teat attachment member having a vacuum attachment end and a teat attachment end, the vacuum attachment end having a longitudinal horizontal axis defined therein, wherein the longitudinal horizontal axis of the vacuum attachment end aligned along the longitudinal horizontal axis of the vacuum generating device, the teat attachment member having a longitudinal vertical axis defined therein, wherein the teat attachment end is shaped to be attached to a mammal's teat and the vacuum attachment end is shaped to be attached to the vacuum generating device,
 wherein the longitudinal vertical axis of the teat attachment member is at an angle of between about 45 and about 135 degrees to the longitudinal horizontal axis of the vacuum attachment end, and wherein the vacuum generating device operates to draw milk from a mammal's teat that is arranged facing generally vertically downward from an udder, through the teat attachment member, and into the milk collection container.

2. The mammal milking device of claim 1, wherein the angle is between about 80 and 100 degrees.

3. The mammal milking device of claim 1, wherein the angle is approximately 90 degrees.

4. The mammal milking device of claim 1, wherein the vacuum generating device includes a manual pump device oriented along the horizontal axis.

5. The mammal milking device of claim 1, wherein the vacuum generating device includes an electric vacuum pump device.

6. The mammal milking device of claim 4, further comprising an electric vacuum pump attachment element, the electric vacuum pump attachment element being configured for connection to an electric vacuum pump.

7. The mammal milking device of claim 1, wherein the milk collection container is attached to the vacuum generating device at vertically bottom side of the vacuum generating device.

8. The mammal milking device of claim 1, wherein the milk collection container is capable of holding at least 8 mg of milk.

9. A mammal milking device, the device comprising:
a milk collection container;
a vacuum generating device having a longitudinal horizontal axis defined therein; and
a teat attachment member having a vacuum attachment end and a teat attachment end, the teat attachment end having a frustoconical section for attachment to a mammal's teat, wherein the frustoconical section having a length of between about ¼ inch and ¾ inche, a maximum width of about 2 inches;

the vacuum attachment end having a longitudinal horizontal axis defined therein, wherein the longitudinal horizontal axis of the vacuum attachment end aligned along the longitudinal horizontal axis of the vacuum generating device, the teat attachment member having a longitudinal vertical axis defined therein, wherein the longitudinal vertical axis of the teat attachment member is at an angle of between about 45 and about 135 degrees to the longitudinal horizontal axis of the vacuum attachment end wherein the mammal milking device draws milk from a mammal having an udder and a plurality of teats that face in a generally vertical downward direction from the udder.

10. The mammal milking device of claim 9, wherein the length of the frustoconical section is between about ⅜ inch and about ⅝ inch.

11. The mammal milking device of claim 9, wherein the vacuum generating device includes a manual pump device, the manual pump device having an elongate piston member arranged generally coaxially with the body portion.

12. The mammal milking device of claim 9, wherein the vacuum generating device includes an electric vacuum pump device.

13. The mammal milking device of claim 11, further comprising an electric vacuum pump attachment element, the electric vacuum pump attachment element being configured to be connected to an electric vacuum pump.

14. The mammal milking device of claim 9, wherein the milk collection container is extends at a generally perpendicular angle relative to the body portion.

* * * * *